United States Patent [19]

Blakely, deceased

[11] 4,402,865

[45] Sep. 6, 1983

[54] METHOD FOR COMULLING METALS WITHOUT CRYSTAL FORMATION

[75] Inventor: Donald W. Blakely, deceased, late of Oakland, Calif., by Robert L. Jacobson, administrator

[73] Assignee: Chevron Research Company, San Francisco, Calif.

[21] Appl. No.: 318,229

[22] Filed: Nov. 4, 1981

[51] Int. Cl.³ .................... B01J 21/02; B01J 21/04; B01J 21/08; B01J 23/88

[52] U.S. Cl. ............................... 252/432; 252/435; 252/439; 252/458; 252/465; 252/469; 252/470

[58] Field of Search ............... 252/465, 432, 435, 439, 252/458, 469, 470

[56] References Cited

U.S. PATENT DOCUMENTS 3,617,528  11/1971  Hilfman ..................... 252/465 X
3,894,966   7/1975  Conway ..................... 252/465
4,179,410  12/1979  Simpson ..................... 252/465

Primary Examiner—W. J. Shine
Attorney, Agent, or Firm—D. A. Newell; S. R. Lapaglia; C. L. Hartman

[57] ABSTRACT

Crystal formation of $CoMoO_4$ and $NiMoO_4$ is prevented in hydroprocessing catalysts containing both cobalt or nickel and molybdenum. The metals are comulled with the support material in the presence of a polyprotic acid.

5 Claims, No Drawings

METHOD FOR COMULLING METALS WITHOUT CRYSTAL FORMATION

BACKGROUND OF THE INVENTION

This invention relates to a method of manufacture and method of use of hydroprocessing catalysts and in particular those catalysts that contain molybdenum and cobalt or nickel.

Hydroprocessing catalysts contain catalytic metals which are frequently one Group VI metal with one Group VIII metal. Preferred metals include molybdenum, nickel and cobalt. A problem frequently encountered with hydroprocessing catalysts that contain molybdenum is caused by formation of the molybdate ion ($MoO_4^=$) which can form molybdate salts with nickel or cobalt. Relatively large crystals of nickel or cobalt molybdate then tend to form in catalysts, concentrating the catalytic metals in the crystals, and thereby reducing the intrinsic activity of the catalyst.

Co-precipitation of the support with active metals gives a very active catalyst, but this method requires washing steps that are expensive, and the metals, particularly molybdenum, may be partially washed off the catalyst. Impregnation does not produce as active a catalyst and two or more calcining steps are necessary. U.S. Pat. Nos. 4,097,413, 4,111,795, and 4,179,410 all describe a method of comulling alumina with ammonium heptamolybdate, drying the resulting mixture under conditions to decompose the ammonium heptamolybdate, adding a cobalt salt and mulling further, extruding, drying and calcining. The drawback with this procedure is its complexity.

SUMMARY OF THE INVENTION

A method is provided for the preparation of molybdenum-containing hydroprocessing catalysts. Molybdenum, at least one Group VIII metal, and a prewashed refractory inorganic oxide catalyst base are comulled in the presence of a polyprotic acid. Catalyst particles are made from the comulled catalyst after shaping, drying and calcining. Such particles are characterized by the substantial absence of crystals of Group VIII metal compounds containing $MoO_4^=$ ions. By "substantial absence" of such crystals, it is meant that less than 3 percent of the molybdenum content of the catalyst particle is present in crystalline molybdates large enough to be detected by X-ray powder diffraction analysis.

DETAILED DESCRIPTION

Hydroprocessing catalysts contain catalytic metals that allow molecular hydrogen to react with hydrocarbonaceous feedstocks in catalytic fashion. One particularly good hydroprocessing metal having catalytic activity is molybdenum, a frequent component of hydroprocessing catalysts. Other metals frequently used in hydroprocessing catalysts include Group VIII metals, particularly, cobalt and nickel. It is known that in catalysts made by the method of comulling the support, the molybdenum and the Group VIII metal, the formation of crystalline molybdates greatly decreases the activity of the catalysts.

It has been discovered that if the refractory inorganic oxide support in the catalytic metals are comulled in the presence of a polyprotic acid, crystal formation of nickel molybdate ($NiMoO_4$) and cobalt molybdate ($CoMoO_4$) is greatly inhibited.

Comulled catalysts are made by the general method of adding the metal to the inorganic oxide support while it is in a pliable, plastic form, such as before or during peptization or during neutralization of the peptized inorganic oxide support.

Peptizing is a process where enough acid is added to wet the inorganic oxide support of the catalyst. It is not clearly known what happens at the surface of the particles comprising the inorganic oxide, but the powder form of the oxide that is the starting material is observing to become a plastic moldable mass. Inorganic oxide supports are conventionally selected from the refractory oxides including alumina, silica, boria, titania and the like. Combinations of two or more oxides may also be used, for example, silica and alumina. Conventional peptizing agents are monoprotic acids, for example, foric acid, acetic acid or nitric acid.

After peptization and, if desired, neutralization, the comulled plastic mass is shaped, dried and calcined, thereby forming catalyst particles. Shaping is done by any of several conventional techniques, for example, pelletizing, spheridizing, and extrusion. Drying and calcining can be tailored from conditions ranging from room temperature drying to calcining at 1200° F. or more, in an atmospheres of air, steam, nitrogen, argon, helium or other gas.

The selection of peptizing agent is based on several criteria, including pore size distribution of catalysts made with the agent, ease of metals loading onto the catalyst, and crush strength of the final catalyst particles. Monoprotic acids are routinely chosen, because there is some evidence that polyprotic acid peptization results in physically weaker catalysts.

Catalysts made by comulling tend to have higher activities than those made by impregnation, but the metals loading of molybdenum is restricted because of formation of crystals of cobalt molybdate or nickel molybdate. Crystal formation adversely effects the dispersion of metals throughout the body of the catalyst particle, causing regions of high metals loadings and regions of little metals loadings, within the catalyst particle.

The crystals of cobalt or nickel molybdate can be easily detected by X-ray powder diffraction, a standard analytic technique. The intensity of X-rays reflecting off a finely ground powder sample is plotted versus the angle of diffraction. The amount of crystalline material can be calculated from the integrated area of the peaks detected compared to standard samples of the crystal of interest. Crystals of larger than about 40 Angstroms of cobalt or nickel molybdate can be detected with this technique. It has been found that catalyst particles made by comulling the molybdenum source with the refractory inorganic oxide support in the presence of a polyprotic acid and a Group VIII metal salt, are characterized by the substantial absence of crystals of Group VIII metal molybdate. Such crystals are either absent from the catalyst particle, or if present, are not large enough to be detected in the X-ray powder diffraction analysis.

"Substantial absence" is herein defined to mean that less than 3 percent of the molybdenum content of the catalyst particle is present in crystalline molybdates large enough to be detected by X-ray powder diffraction.

Polyprotic acids suitable for this invention include both polyprotic mineral acids, for example phosphoric acid and sulfuric acid, and polyprotic organic acid, for example oxalic acid, maleic acid and succinic acid. Other polyprotic acids can be used.

Catalysts with up to 30 weight percent molybdenum or more (where weight percent is based on the weight of the reduced metal relative to the weight of the total catalyst) can be made using the technique of the present invention. Preferably, catalysts containing about 20 weight percent molybdenum can be formulated by this invention, without formation of crystals of molybdate salts.

Catalysts made by the present invention are useful in hydroprocessing hydrocarbonaceous feedstocks. Generic hydrotreating conditions include reactions in the temperature range of about 200° to about 550° C., a total pressure in the range of from about 1 atmosphere to about 300 atmospheres with a total hydrogen partial pressure of up to about 200 atmospheres, a hydrogen to oil feed ratio of up to 9000 standard cubic liters of hydrogen per liter of oil and an hourly liquid space velocity of about 0.02 to about 25 reciprocal hours.

Conventional hydroprocess can be done within these conditions, including hydrocracking, hydrofining, hydrodenitrification, hydrodesulfurization, hydrodemetalation and any other process using molecular hydrogen in contact with hydrocarbonaceous feedstocks. A particularly preferred catalyst made by the use of this invention is a denitrification catalyst. It is well known in the art how to tailor reaction conditions within the ranges recited to feedstocks and desired products.

EXAMPLE 1

137 grams of Catapal alumina, obtained from Conoco, was placed in a small Baker-Perkins mixer with 7 grams of sulfuric acid and 100 grams of water. The mixture was mixed for 30 minutes. 15.0 grams of $CoMoO_4 \cdot H_2O$ was then added and the mixture was mixed for another 30 minutes. 10 cc of ammonium hydroxide in 10 cc of water was then added and mixing was resumed for 20 minutes. 15.1 grams of ammonium heptamolybdate was added and the resulting mixture mixed for 30 minutes. The resulting paste was extruded through a 3/32" circular die and the extrudate was dried at 120° F. overnight. The dried extrudate was calcined at 250° F. for 4 hours, then at 450° F. for 4 hours, and finally at 950° F. for 4 hours under an oxidizing atmosphere.

The calcined catalyst particles had a surface area of 265 $m^2$/gram; particle density of 1.202 grams/cc and skeletal density of 3.504 grams/cc.

EXAMPLE 2

137 grams of Catapal alumina, obtained from Conoco, was placed in a small Baker-Perkins mixer with 6 grams of acetic acid and 100 grams of water and mixed for 50 minutes. 15 grams of $CoMoO_4 \cdot H_2O$ was mulled in for 30 minutes, then the mixture was partially neutralized by 8 cc ammonium hydroxide in 24 cc water and mixed for 20 minutes. 15.1 grams of ammonium heptamolybdate was then mulled in for 30 minutes and the resulting paste extruded through a 3/32" circular die and dried at 120° F. overnight. The dried extrudate was calcined at 250° F. for 4 hours, then 450° F. for 4 hours and finally at 950° F. for 4 hours under in oxidizing atmosphere.

The calcined catalyst particles had a surface area of 290 $m^2$/gram; a particle density of 1.102 g/cc and a skeletal density of 3.553 g/cc.

EXAMPLE 3

The catalyst particles made by the methods of Example 1 and Example 2 were analyzed for crystalline cobalt molybdate by X-ray powder diffraction.

The X-ray diffraction data was obtained on a Siemens X-ray diffractometer and compared to known samples of $CoMoO_4$-111 (ASTM No. 21-868) and $CoMoO_4$-11 (ASTM No. 25-1434). The X-ray data shows no detectable $CoMoO_4$ in the sample from Example 1 but 9% of the Mo present in the sample of Example 2 is present as $CoMoO_4$.

I claim:

1. A method for the preparation of molybdenum-containing hydroprocessing catalysts comprising:
   (a) peptizing a prewashed refractory inorganic base in the presence of a polyprotic acid while mulling;
   (b) adding a Group VIII metal compound while mulling;
   (c) neutralizing the polyprotic acid;
   (d) adding a molybdenum compound while mulling;
   (e) shaping, drying, and calcining catalyst particles from said comulled refractory inorganic oxide catalyst base, said catalyst particles characterized by the substantial absence of crystals of Group VIII metal compounds containing $MoO_4^=$ ions.

2. The method of claim 1 wherein said Group VIII metal compounds are selected from the group comprising cobalt and nickel.

3. The method of claim 1 wherein said refractory inorganic base is selected from the group comprising alumina, silica, boria, titania, and combinations thereof.

4. The method of claim 1 wherein said polyprotic acid is selected from the group consisting of phosphoric acid, sulfuric acid, oxalic acid, maleic acid, and succinic acid.

5. The method of claim 1 wherein said catalyst particles are further characterized by molybdenum content in the range of up to 30 weight percent, said weight percent based on the weight of the reduced metal to total catalyst body weight.

* * * * *